Feb. 5, 1957
F. R. HYNSON
2,780,340
TURNING DEVICE
Filed Nov. 4, 1954
4 Sheets-Sheet 1
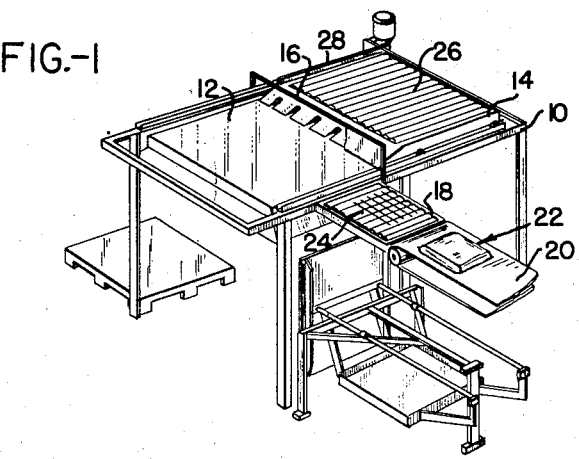
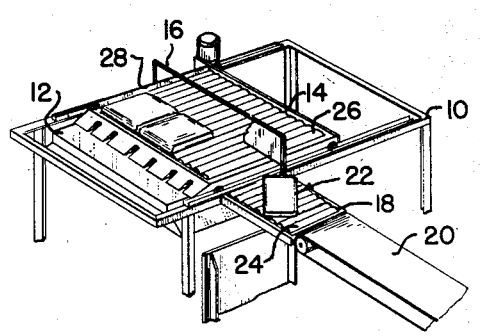
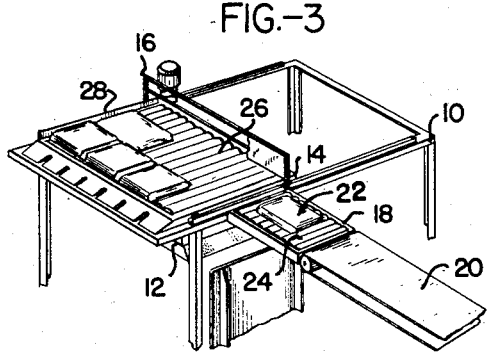
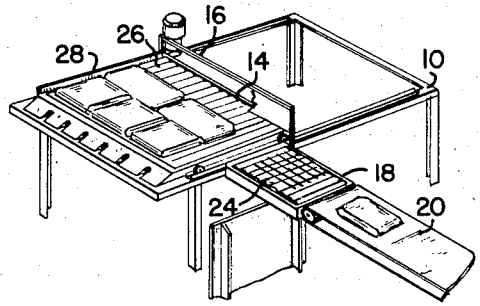
*INVENTOR.*
FREDERIC R. HYNSON
BY Toulmin & Toulmin
ATTORNEY Feb. 5, 1957 F. R. HYNSON 2,780,340
TURNING DEVICE
Filed Nov. 4, 1954 4 Sheets-Sheet 2
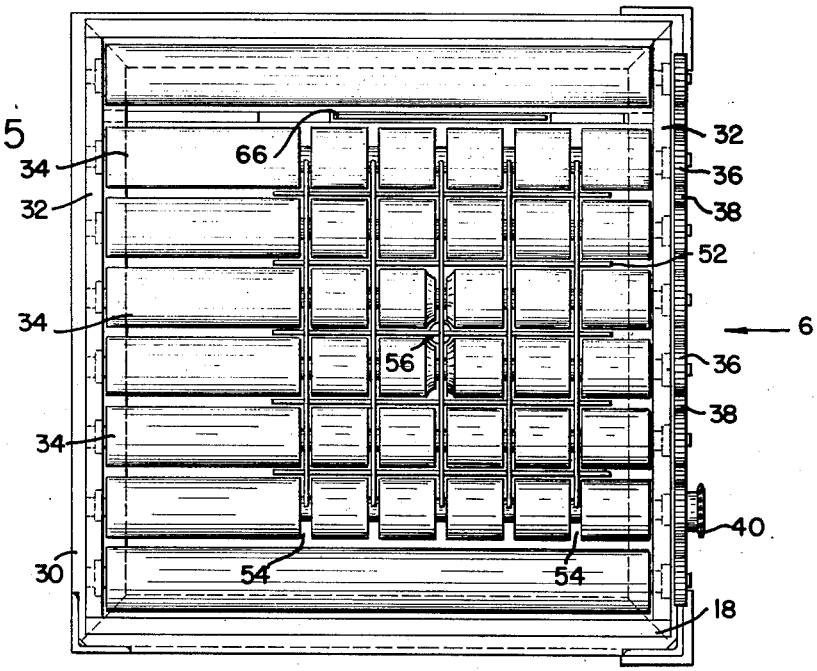
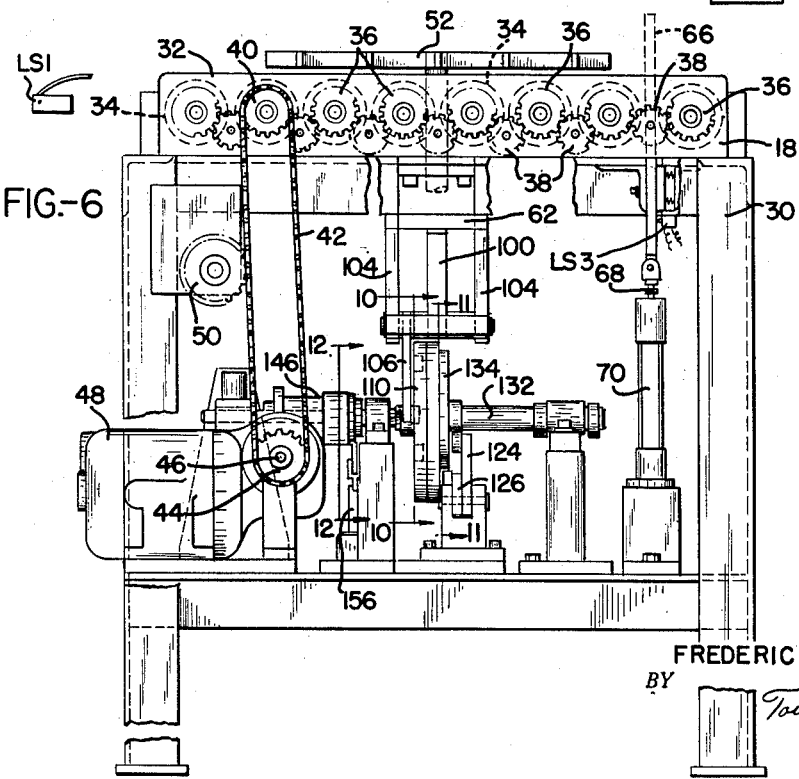
INVENTOR.
FREDERIC R. HYNSON
BY Toulmin & Toulmin
ATTORNEY Feb. 5, 1957 F. R. HYNSON 2,780,340
TURNING DEVICE
Filed Nov. 4, 1954 4 Sheets-Sheet 3
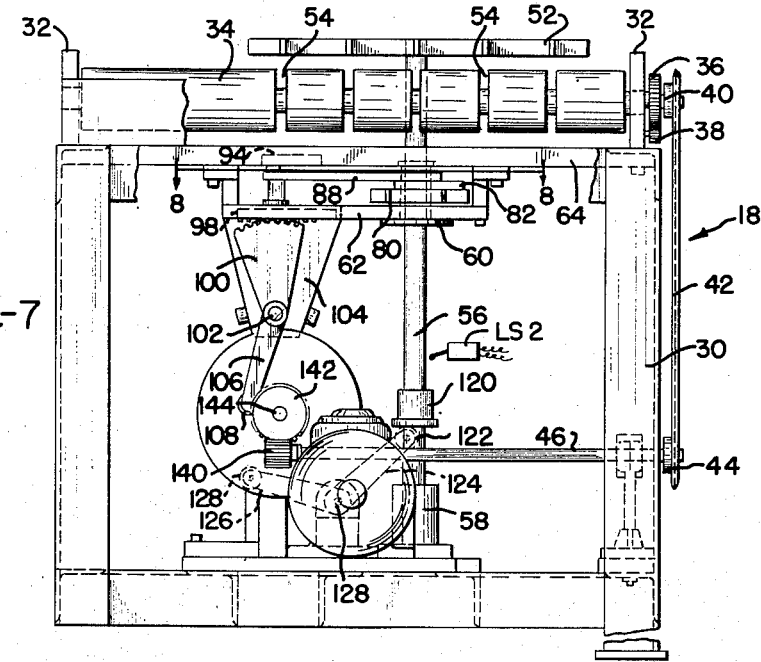
FIG.-7
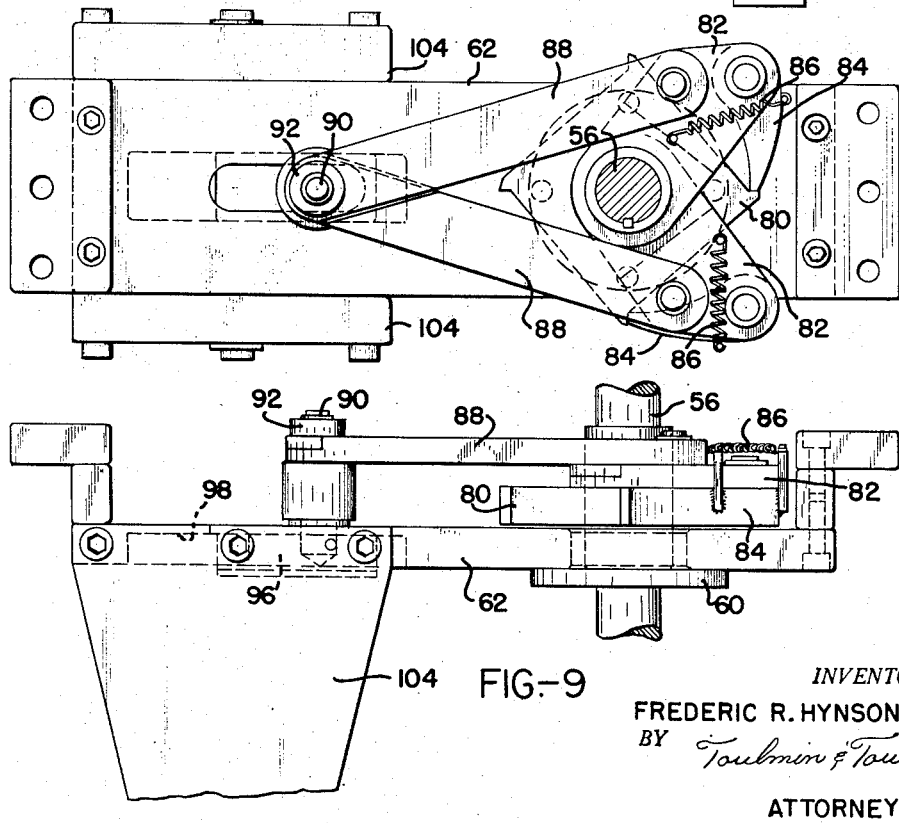
FIG.-8
FIG.-9
INVENTOR.
FREDERIC R. HYNSON
BY Toulmin & Toulmin
ATTORNEY

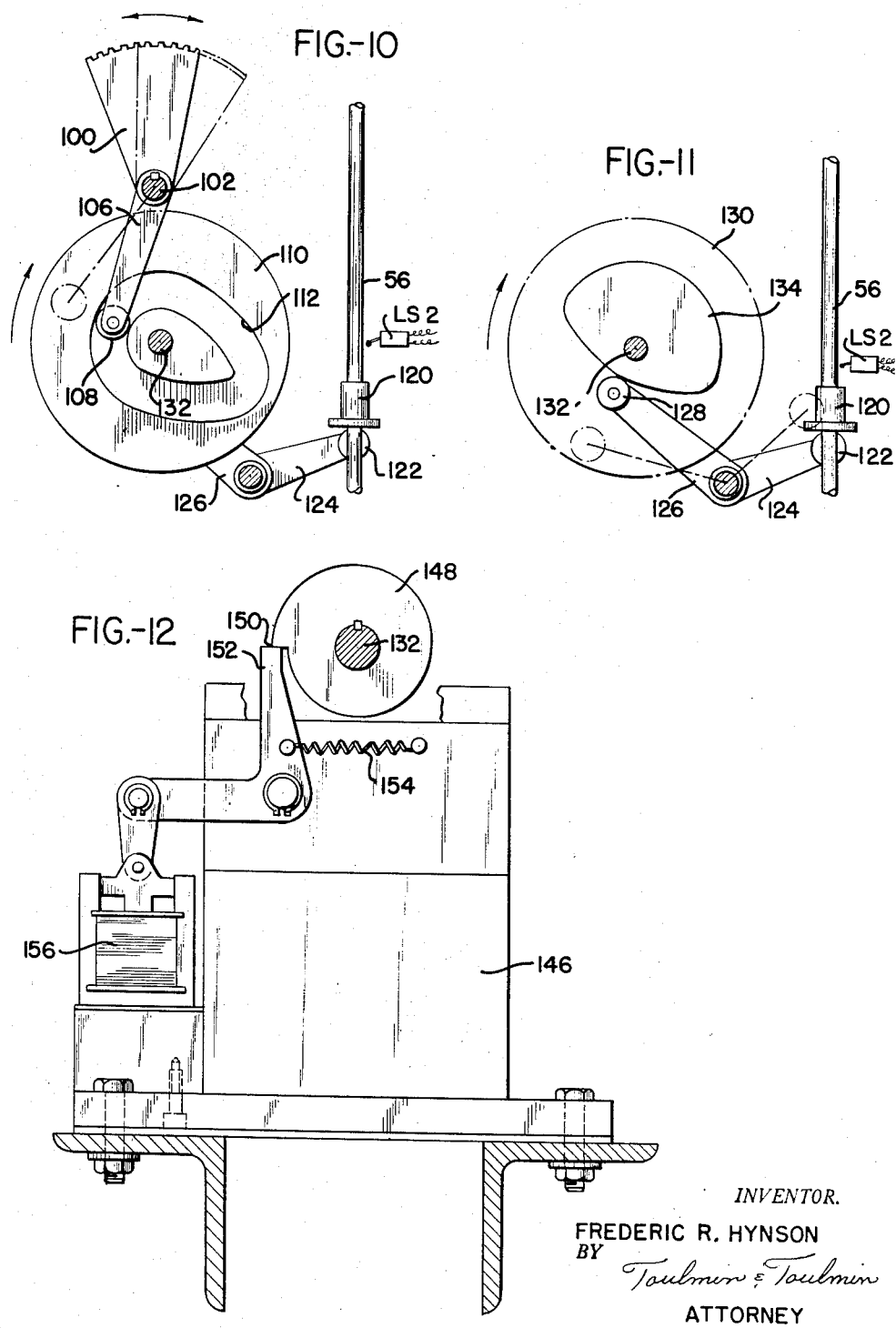

United States Patent Office 2,780,340
Patented Feb. 5, 1957

2,780,340

TURNING DEVICE

Frederic R. Hynson, Louisville, Ky., assignor to Miller Engineering Corporation, Louisville, Ky., a corporation of Kentucky Application November 4, 1954, Serial No. 466,727

4 Claims. (Cl. 198—33)

This invention is related to a turning device for use in connection with palletizing machines, and is particularly concerned with an arrangement adapted for conveying articles thereacross while selectively rotating some of the articles through ninety degrees.

In a co-pending application in the name of Frank H. Miller, Jr., Serial No. 460,482, filed October 5, 1954, there is shown an automatic palletizing device which includes in the combination a conveyor table such as is shown in detail in the present application.

In the palletizing device of the above-referred to Miller application, there is an arrangement for delivering elongate articles such as packages, boxes, cartons, or bags, in the direction of their length, to be received on a receiving table in rows and transferred therefrom to a pallet with the articles in adjacent rows of each layer being turned at respectively right angles to each other.

The idea of turning articles of this nature at right angles during the palletizing thereof is, of course, known and has been done manually, as well as automatically, in connection with palletizing machines.

Devices for so rotating articles, however, are usually of relatively complex form, are not always positive in operation, do not lend themselves to simple automatic control, and, in some cases, are not adapted for continuous operation as is the case when it is necessary to palletize articles at a high rate of speed.

Having the foregoing in mind, it is a primary object of this invention to provide a turning device for particular use in connection with palletizing devices which will avoid the drawbacks referred to above.

A still further object is the provision of a device adapted for being inserted in line with a conveyor which is conveying articles and which device is selectively operable for turning the articles through ninety degrees during their travel over the device.

Another particular object of this invention is the provision of a turning device of the nature referred to, which is relatively simple in construction and which is simple and easy to control in operation.

These and other objects and advantages of this invention will become more apparent upon reference to the following specifications taken in connection with the accompanying drawings, in which:

Figure 1 is a perspective view of an automatic palletizing machine utilizing a turning device according to the present invention with the palletizing machine completely unloaded.

Figure 2 is a view similar to Figure 1, but showing the receiving table in position for receiving the first row making up the first layer of articles to be palletized;

Figure 3 is a view like Figure 2, but shows the receiving table shifted to its extreme left hand position for receiving the second row of articles to be placed thereon;

Figure 4 is a view like Figure 3, but shows the second row of articles completed on the receiving table prior to being transferred to an elevator platform;

Figure 5 is a plan view of the turning device of the present invention;

Figure 6 is a side elevational view looking in at Figure 5 in the direction of the arrow 6;

Figure 7 is a view of the turning device looking in from the left side of Figure 6;

Figure 8 is a section indicated by line 8—8 on Figure 7 showing a ratchet mechanism by means of which a portion of the turning device is rotated;

Figure 9 is a side elevational view of the ratchet mechanism illustrated in Figure 8;

Figure 10 is a vertical sectional view indicated by line 10—10 on Figure 6;

Figure 11 is also a vertical sectional view indicated by line 11—11 on Figure 6; and Figure 12 is still another vertical sectional view indicated by line 12—12 on Figure 6.

Referring to the drawings somewhat more in detail, the palletizing device rather diagrammatically illustrated in Figures 1 through 4, comprises a frame 10 within which there is a vertically reciprocable elevator platform 12. A receiving table 14 is movably mounted in frame 10 so that it can be positioned over platform 12. A stripper bar 16 is located over the right-hand side of the elevator platform so that when the receiving table is moved rightwardly beneath the stripping bar any articles on the table will be stripped therefrom and dropped on the elevator platform.

Adjacent frame 10, immediately leftwardly of stripper bar 16, is a conveyor table 18 and a conveyor 20 is arranged to supply articles to the conveyor table as indicated at 22.

In operation, articles 22 can be conveyed straight across conveyor table 18 by the rotation of the continuously driven rollers 24 thereof, and in which case they will be delivered to the receiving table 14 and conveyed thereacross by the continuously driven rollers 26 until they either abut the stop bar 28 or strike a previously delivered article.

During the travel of the articles across conveyor table 18 they can be rotated through ninety degrees in a manner to be described hereinafter, and Figure 2 illustrates the receiving table 14 with a first row of turned articles built up thereon.

After receiving the first row of articles, the receiving table shifts leftwardly and receives a second row of articles unturned. This builds up a complete layer, as illustrated in Figure 4, and this layer is then dropped on the elevator platform by rightward movement of the receiving table under stripper bar 16.

Turning now to the particular construction of the conveyor table 18 and the turning mechanism associated therewith, the table comprises a fabricated frame 30. Upstanding from the two side edges of frame 18 are side plates 32, and rotatably supported between the side plates 32 are the rollers 34.

These rollers carry gears 36 at their one end connected by idlers 38 so that the rollers will all rotate in the same direction. One roller has a sprocket 40 driven by a chain 42 which passes over sprocket 44 on drive-shaft 46 of geared head motor 48. An adjustable idler sprocket 50 maintains chain 42 taut.

As will be seen in the plan view, Figure 5, there is a grid 52 so arranged that the bars making up the grid will either be disposed between adjacent rollers 34 or will be disposed within grooves 54 formed therein. Because of this, when the grid is in a lowered position articles will be conveyed directly thereover, while raising of the grid will lift articles from the feed rollers.

Grid 52 is fixed to the upper end of a shaft 56 slidably guided by a bearing 58 at its lower end and also slidable in a bearing means 60 that is carried in a plate 62 suspended by bracket means from a bar 64 fixed in frame 10.

Toward the discharge side of conveyor table 18 there is a vertically movable stop plate or trimmer plate 66 mounted on the upper end of a double acting ram 68 reciprocable in a cylinder 70. The normal position of stop plate 66 is below the level of rollers 34 but it can be elevated to the position in which it is illustrated in Figure 6 to interrupt the travel of articles passing over the table.

A limit switch LS1 which detects the approach of an article to the table, will, when made effective, cause the stop plate to be lifted by its motor 68, 70. It will be noted that stop plate 66 is supported so as to be yieldable when engaged by an article passing across the table.

A second limit switch LS3 is associated with the stop plate so that when the stop plate is in its upper position and yields in the described manner, the limit switch LS3 will be actuated and cause energization of a solenoid which will bring about lifting and turning of grid 52 in a manner to be described hereinafter.

A third limit switch LS2 deenergizes the motor 68, 70 when the grid is lifted thus permitting the stop plate to move to its lowered position. In this manner an article to be turned can be stopped on the table and after being turned will then proceed on across the table.

The grid 52 is adapted for being rotated by a mechanism illustrated in Figures 8 and 9. In these figures it will be noted that the shaft 56 to which the turning grid is fixed is slidably keyed to a four-tooth ratchet plate 80 which is rotatable about the axis of the said shaft.

Rotatably associated with shaft 56 immediately above ratchet plate 80 is a pair of arms 82, each of which has pivotally connected thereto a pawl 84, each of which is urged toward the periphery of the ratchet plate by a spring 86.

Each arm 82 has pivoted thereto a link 88 with the ends of the links 88 opposite their connection with the said arms being pivotally connected with a vertical pin 90. Pin 90 is a portion of an assembly that includes a guide roller 92 slidably in guide slot 94 in the under side of plate 64. Pin 90 also extends downwardly through a slot in support plate 62 and is secured therebeneath to a rack 96, slidable in a guide slot 98 in the under side of plate 62.

Rack 96 is availed of for reciprocating pin 90 which, in turn, will cause links 88 to reciprocate and oscillate arms 82 about the axis of shaft 56, which will bring about rotation of the said shaft through an angle of ninety degrees in response to a complete to and fro movement of pin 90. For actuating rack 96 there is a gear sector 100 mounted on shaft 102 extending between plates 104 that are suspended from opposite sides of support plate 62. Fixed to gear sector 100 is an arm 106 having a cam following roller 108 thereon.

The gear sector 100, arm 106, and roller 108 are illustrated in Figure 10 in relation to the cam 110 by means of which the arm and gear sector are oscillated. Cam 110 comprises a cam track 112 in which roller 108 rides and this cam track provides for holding the arm stationary during the first ninety degrees of movement of the cam in a clockwise direction from its normal Figure 10 position, then will bring about the movement of the arm leftwardly during the next ninety degrees of movement of the cam, will then cause swinging movement of the arm to the right during the next ninety degrees of rotation of the cam, putting the arm back to its original position, and then will retain the arm in that position during the final ninety degrees of rotation of the cam.

For lifting the grid 52, shaft 56 has a collar 120 thereon engaged by roller 122 on one end of arm 124 of a bell crank having a second arm 126 with a cam following roller 128. Bell crank 124 is pivotally supported in the frame at 128.

Figure 11 shows the aforementioned bell crank and its actuating cam. This cam, indicated at 130, is mounted on shaft 132 in fixed relation to cam 110, which is also on this same shaft. Cam 130 comprises cam track 134 on which roller 128 rides. The cam track provides for lifting movement of shaft 56 and grid 52 during the first ninety degrees of rotation of the cam, then holds the shaft and grid in elevated position during the next 180 degrees of rotation of the cam, and then lowers the grid and shaft to its original position during the final 90 degrees of rotation of the cam. It will be noted that there is no rotation of the grid during the time it is raising and lowering, and no raising and lowering of the grid during the time that it is rotating.

The end of output shaft 46 of geared head motor 48 opposite sprocket 44 carries a worm gear 140 meshing with a worm wheel 142 on a shaft 144 that is connected via a friction clutch 146 with shaft 132.

The shaft 132 is adapted for being held stationary by a plate 148 thereon having a shoulder 150 engaged by a stop lever 152. Stop lever 152 is urged into locking position by spring 154 and is adapted for being moved to release plate 148 by energization of a solenoid 156. This arrangement provides for a single rotation of shaft 132 upon an electrical impulse being delivered to the unlatching solenoid 156 which is accomplished by closing of LS3 when the stop plate 66 is raised. This single revolution of shaft 132 provides for first, raising of the grid 52 to lift the article from the feed rolls, then rotation of the grid through ninety degrees, to turn the lifted article, and then return of the grid to its lowered position, to return the article to the feed rolls.

From the foregoing it will be conceived that the present invention provides a relatively simple and rapidly operated device adapted for being inserted in a conveyor line, or between the end of a conveyor and a palletizing machine and operable for select rotating articles being conveyed thereacross through an angle of ninety degrees.

It will be understood that this invention is susceptible to modification in order to adapted it to different usages and conditions, and, accordingly, it is desired to comprehend such modifications within this invention as may fall within the scope of the appended claims.

I claim:

1. In a device of the nature described; a frame, a plurality of coplanar feed rollers rotatably mounted in said frame and continuously driven in the same direction, a lifting and turning grid consists of bars parallel with the rollers and therebetween and other bars extending at right angles to said rollers normally below the tops of feed rollers, some of said rollers being grooved to receive said other bars, first cam means for raising and lowering said grid, second cam means for rotating said grid through ninety degrees, a shaft supporting said cam means, and means for selectively driving said shaft in a single revolution for one complete cycle of operation for said grid, consisting of first, the raising thereof, second, the rotation thereof through ninety degrees, and third, the lowering thereof to its normal position.

2. In a device of the nature described; a frame, a plurality of coplanar continuously rotating feed rollers in said frame, a lifting and turning grid in said frame normally below the tops of said rollers, a first cam rotatable through a single revolution for first raising and then lowering said grid and a second cam for rotating said grid through 90 degrees, a shaft supporting said cams, a motor drivingly connected with said rollers and also connected for driving one element of a friction clutch, the other element of said friction clutch being connected with said shaft, means for holding said shaft stationary, and means for releasing said shaft to make one revolution and for stopping the shaft at the end of said single revolution.

3. In a device of the nature described; a frame, a plurality of coplanar continually rotating feed rollers in said frame, a lifting and turning grid in the frame normally below the tops of said rollers, a stop plate in the frame positioned on the side of said grid toward which the rollers deliver articles, a first cam for first raising said grid, for then supporting the grid in raised position and for then lowering the grid during one revolution of the cam, second cam operable, during one revolution for rotating the grid through 90 degrees during the interval that it is supported in its upper position by said first cam, a shaft supporting said cams, a motor driveningly connected with said rollers and having a friction driving connection with said shaft, latching means normally holding said shaft against rotation, means for momentarily disengaging said latching means to permit a single revolution of said shaft, and means selectively operable for elevating said stop plate before the grid is raised, and for lowering said stop plate before the grid commences its rotation.

4. In a device of the nature described; a frame, a plurality of coplanar continuously rotating feed rollers in said frame, a lifting and turning grid in said frame normally below the tops of said rollers, cam means in the frame rotatable through a single revolution for lifting said grid and then rotating said grid through 90° and then lowering said grid thereby to pick up articles from said feed rollers and turn them and then set them down on the feed rollers again, single revolution drive means drivingly connected with said cam means, a stop plate on the side of said frame toward which articles are moved thereacross by said feed rollers, said stop plate being normally below the tops of said feed rollers, means for moving said stop plate upwardly to interrupt the travel of an article across the feed rollers, means responsive to engagement of said stop means by an article being moved by said feed rollers for actuating said drive means to commence rotation of the cam means and raising movement of the said grid to pick up the said article, and means for lowering said stop plate before the cam means commence rotation of said grid.

References Cited in the file of this patent

UNITED STATES PATENTS

| | | |
|---|---|---|
| 277,815 | Wellman | May 15, 1883 |
| 1,778,621 | Beatty | Oct. 14, 1930 |
| 2,633,251 | Bruce | Mar. 31, 1953 |
| 2,641,371 | Webster | June 9, 1953 |
| 2,678,151 | Geisler | May 11, 1954 |